United States Patent
Kikuchi et al.

(10) Patent No.: US 9,676,626 B2
(45) Date of Patent: Jun. 13, 2017

(54) IF$_7$-DERIVED IODINE FLUORIDE COMPOUND RECOVERY METHOD AND RECOVERY DEVICE

(71) Applicant: CENTRAL GLASS COMPANY, LIMITED, Ube, Yamaguchi (JP)

(72) Inventors: Akiou Kikuchi, Ube (JP); Masanori Watari, Ube (JP)

(73) Assignee: CENTRAL GLASS COMPANY, LIMITED, Ube (JP)

( * ) Notice: Subject to any disclaimer, the term of this patent is extended or adjusted under 35 U.S.C. 154(b) by 205 days.

(21) Appl. No.: 14/444,020

(22) Filed: Jul. 28, 2014

(65) Prior Publication Data

US 2015/0037242 A1    Feb. 5, 2015

(30) Foreign Application Priority Data

Aug. 2, 2013    (JP) ................................. 2013-161442

(51) Int. Cl.
    *C01B 7/24*    (2006.01)
    *B01J 19/24*    (2006.01)

(52) U.S. Cl.
    CPC ............. *C01B 7/24* (2013.01); *B01J 19/2415* (2013.01); *B01J 2219/24* (2013.01)

(58) Field of Classification Search
    CPC ....................................................... C01B 7/24
    USPC ................................................. 423/466, 469
    See application file for complete search history.

(56) References Cited

U.S. PATENT DOCUMENTS

| | | | |
|---|---|---|---|
| 5,958,138 A | 9/1999 | Tomita et al. | |
| 6,290,864 B1 | 9/2001 | Patel et al. | |
| 6,581,612 B1* | 6/2003 | Loewenhardt | ...... C23C 16/4405 134/1.1 |
| 2006/0086376 A1* | 4/2006 | Dimeo, Jr. | ............ C23C 14/564 134/22.1 |
| 2010/0154835 A1* | 6/2010 | Dimeo | .................. C23C 14/564 134/31 |
| 2010/0196251 A1 | 8/2010 | Shibayama et al. | |

FOREIGN PATENT DOCUMENTS

| | | |
|---|---|---|
| EP | 1313896 A2 | 5/2003 |
| GB | 1060708 | 3/1967 |
| GB | 1326130 A | 8/1973 |
| GB | 1473075 A | 5/1977 |

(Continued)

OTHER PUBLICATIONS

Office Action dated Aug. 19, 2015 regarding a corresponding Korean Patent Application No. 10-2014-0099173.
Taiwanese Office Action dated Apr. 17, 2015 of corresponding Taiwanese application No. 103126096 with the partial English translation.
Database WPI Week, Oct. 5, 2006, Thomson Scientific, London, GB.

(Continued)

*Primary Examiner* — Ngoc-Yen Nguyen
(74) *Attorney, Agent, or Firm* — Typha IP LLC

(57) ABSTRACT

An IF$_7$-derived iodine fluoride compound recovery method includes putting gas containing IF$_7$ into contact with a material to be fluorinated, thereby converting the IF$_7$ into IF$_5$; and cooling gas containing the IF$_5$, thereby trapping the IF$_5$ as an IF$_7$-derived iodine fluoride compound. The recovered IF$_5$ may be reacted with fluorine to generate IF$_7$, which may be reused for a semiconductor production process.

9 Claims, 1 Drawing Sheet

(56) References Cited

FOREIGN PATENT DOCUMENTS

| | | |
|---|---|---|
| JP | H03-243775 A | 10/1991 |
| JP | H9-129561 A | 5/1997 |
| JP | H11-160491 A | 6/1999 |
| JP | 2000-117052 A | 4/2000 |
| JP | 2000-159505 A | 6/2000 |
| JP | 2004-518271 A | 6/2004 |
| JP | 2006-265057 A | 10/2006 |
| JP | 2009-23896 A | 2/2009 |
| JP | 2010-155742 A | 7/2010 |
| JP | 2011-5477 A | 1/2011 |
| KR | 10-2010-0031616 A | 3/2010 |
| WO | 2007/127865 A2 | 11/2007 |

OTHER PUBLICATIONS

Walter C Schumb et al., Iodine Heptafluoride, Industrial and Engineering Chemistry, Jan. 1, 1950, pp. 1383-1386, vol. 42, American Chemical Society, US.

Extended European search report dated Oct. 30, 2014 of corresponding European application No. 14002690.7.

Chinese Office Action issued on Aug. 12, 2016 for corresponding Chinese Application No. 201410375846.3 with partial English translation.

Chinese Office Action issued on Feb. 27, 2017, for corresponding Chinese Patent Application No. 201410375846.3.

Japanese Office Action mailed on Mar. 28, 2017 for corresponding Japanese Patent Application No. 2013-161442, With Partial English Translation.

* cited by examiner

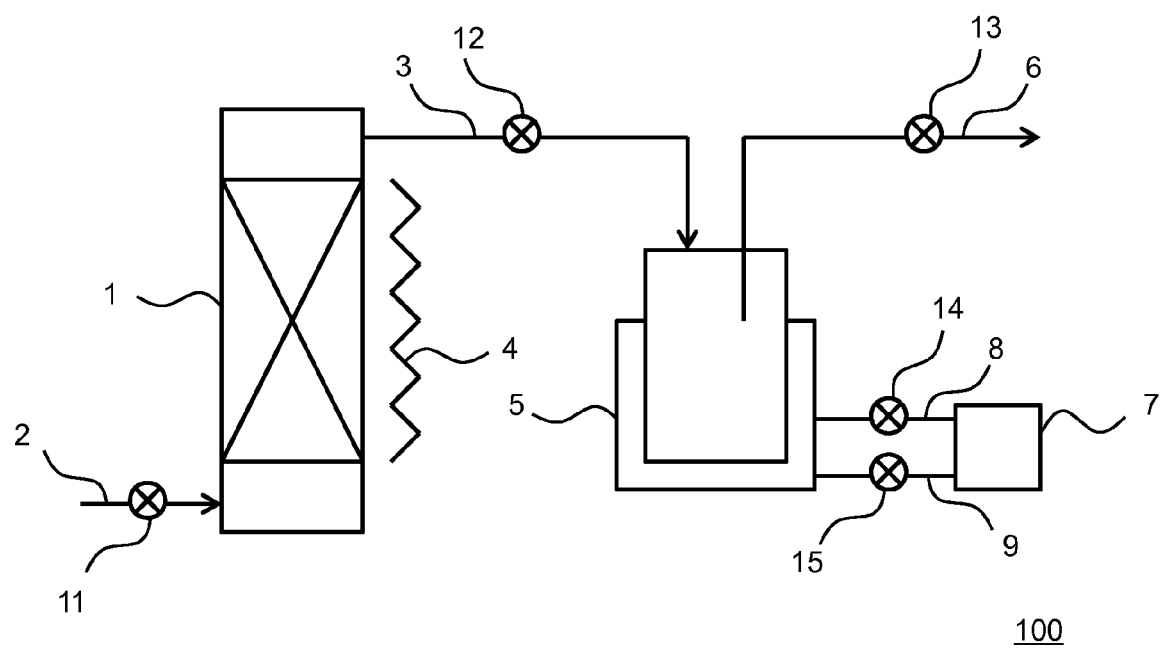

$IF_7$-DERIVED IODINE FLUORIDE COMPOUND RECOVERY METHOD AND RECOVERY DEVICE

CROSS REFERENCE TO RELATED APPLICATIONS

This application is based upon and claims the benefit of priority from the prior Japanese Patent Application No. 2013-161442, filed on Aug. 2, 2013, the entire contents of which are incorporated herein by reference.

FIELD

The present invention relates to a recovery method and a recovery device for an iodine heptafluoride ($IF_7$)-derived iodine fluoride compound, more specifically to a method for recovering an $IF_7$-derived iodine fluoride compound with no use of a very low temperature and a recovery device therefor.

BACKGROUND $IF_7$ is one type of gas useful for etching in a semiconductor production process or for cleaning in nuclear industry. For example, Japanese Laid-Open Patent Publication No. 2009-23896 describes using $IF_7$ or $IF_5$ as gas for etching or cleaning in a semiconductor production process. Generally in an etching process using $IF_7$, the utilization factor of $IF_7$ is as low as 5 to 20%, and a most part of $IF_7$ is discharged as exhaust gas. However, such a fluoride discharged into the atmosphere promotes global warming. In addition, iodine occupies a high ratio of production cost of $IF_7$. For these reasons, it is desired to recover and reuse $IF_7$.

As a method for recovering a fluoride from exhaust gas, Japanese Laid-Open Patent Publication No. Hei 9-129561, for example, describes a method of cold-trapping fluorine-based gas by use of a cold trap that uses low-boiling point inert gas (liquid nitrogen, liquid argon, etc.) as a coolant. However, unlike other fluorides, $IF_7$ needs a very low temperature of about $-200°$ C. to be recovered by cold-trapping, and it imposes a great load on the device to keep such a low temperature. In addition, $IF_7$ easily sublimates at a low pressure as in the semiconductor process. Therefore, use of a generally used cold trap having a temperature of about $-30$ to $-80°$ C. decreases the recovery ratio.

Japanese Laid-Open Patent Publication No. 2000-117052 describes a method of recovering a fluoride free of impurities by adsorbing the fluoride to a specific adsorbent such as activated carbon or the like and desorbing the fluoride by heating. However, it is difficult to refine and reuse $IF_7$ by use of such an adsorption and desorption method because unlike other fluorides, $IF_7$ is easily reactive with an adsorbent such as activated carbon, zeolite or the like.

Japanese Laid-Open Patent Publication No. 2011-5477 describes a method of reacting iodine fluoride with an agent such as soda lime or the like to detoxify the iodine fluoride. Since iodine fluorides such as $IF_7$, $IF_5$ and the like are costly, it is not economical to detoxify exhaust gas generated after etching by use of a wet or dry detoxification device.

SUMMARY

As described above, unlike other fluorides, $IF_7$ is difficult to be recovered from exhaust gas, and thus the recovery ratio of $IF_7$ is very low. Therefore, $IF_7$ has not been generally recovered from exhaust gas so far. However, for the reasons of economy and environmental conservation, an $IF_7$-derived iodine fluoride compound recovery method which is highly efficient and has little influence on the global environment is now desired.

The present invention for solving the above-described problems provides a method for recovering an $IF_7$-derived iodine fluoride compound at a high efficiency with no use of a very low temperature, and a recovery device therefor.

The present inventors found that $IF_7$ can be recovered at a high efficiency and in an energy-saving manner by converting $IF_7$ into $IF_5$, which can be trapped at a significantly higher temperature of gas than $IF_7$, instead of recovering $IF_7$ directly from exhaust gas, and achieved the present invention. The present invention provides an $IF_7$ recovery method made with an attention being focused on that the cooling temperature necessary to trap $IF_5$ is realized by a general-purpose cooling device. Such an $IF_7$ recovery method has not been reported so far.

An embodiment of the present invention provides an $IF_7$-derived iodine fluoride compound recovery method that includes putting gas containing $IF_7$ into contact with a material to be fluorinated, thereby converting the $IF_7$ into $IF_5$; and cooling gas containing the $IF_5$, thereby trapping the $IF_5$ as an $IF_7$-derived iodine fluoride compound.

The $IF_7$-derived iodine fluoride compound recovery method may further includes reacting the $IF_5$ that is recovered with fluorine, thereby generating $IF_7$; and reusing the generated $IF_7$ for a semiconductor production process.

In the $IF_7$-derived iodine fluoride compound recovery method, the material to be fluorinated may contain at least one element selected from Si, Al, W and I at a content of at least 20% by weight.

In the $IF_7$-derived iodine fluoride compound recovery method, the material to be fluorinated may be Si.

In the $IF_7$-derived iodine fluoride compound recovery method, the $IF_5$ may be recovered at a temperature of $-80°$ C. or higher and $50°$ C. or lower.

An embodiment of the present invention provides an $IF_7$-derived iodine fluoride compound recovery device including a reaction tube filled with a material to be fluorinated, to which $IF_7$ is to be introduced; and a trap device that is connected to the reaction tube and traps $IF_5$.

In the $IF_7$-derived iodine fluoride compound recovery device, the reaction tube may be connected to a semiconductor production device that uses $IF_7$.

In the $IF_7$-derived iodine fluoride compound recovery device, the material to be fluorinated may contain at least one element selected from Si, Al, W and I at a content of at least 20% by weight.

In the $IF_7$-derived iodine fluoride compound recovery device, the material to be fluorinated may be Si.

In the $IF_7$-derived iodine fluoride compound recovery device, the trap device may cool gas containing the $IF_5$ at a temperature of $-80°$ C. or higher and $50°$ C. or lower to recover the $IF_5$.

The $IF_7$-derived iodine fluoride compound recovery device may further include a fluorination device that reacts the $IF_5$ that is recovered with fluorine to generate $IF_7$.

BRIEF DESCRIPTION OF DRAWINGS

FIG. 1 is a systematic view of an $IF_7$-derived iodine fluoride compound recovery device according to an embodiment of the present invention.

REFERENCE SIGNS LIST

1: reaction tube; 2: exhaust gas flow-in passage; 3: exhaust gas flow-out passage; 4: heating unit; 5: trap device; 6: gas discharge passage; 7: chiller; 8: introduction passage; 9: introduction passage; 11: valve; 12: valve; 13: valve; 14: valve; 15: valve; 100: recovery device

DESCRIPTION OF EMBODIMENTS

Hereinafter, an $IF_7$-derived iodine fluoride compound recovery method and recovery device according to the present invention will be described with reference to the drawings. The $IF_7$-derived iodine fluoride compound recovery method and recovery device according to the present invention are not to be construed as being limited to the following embodiments or examples. In the drawings referred to in the embodiments and examples, the same elements or elements having the same functions will bear the same reference signs, and the descriptions thereof will not be repeated.

According to the present invention, an $IF_7$-derived iodine fluoride compound is recovered by putting $IF_7$ into contact with a material to be fluorinated and thus converting the $IF_7$ into $IF_5$. For such a method of recovery, an attention is focused on that $IF_7$ and $IF_5$ are different in the vapor pressure. Unlike $IF_7$, $IF_5$ can be recovered as a solid at a high temperature (temperature that is not a very low temperature). Namely, the present invention has a feature of converting $IF_7$ into $IF_5$, so that a general-purpose cooling device can be used for the recovery.

FIG. 1 is a systematic view of a recovery device 100 according to an embodiment of the present invention. The recovery device 100 includes a reaction tube 1 filled with a material to be fluorinated and a trap device 5 that is connected to the reaction tube 1 and traps $IF_5$. To the reaction tube 1, $IF_7$ is to be introduced. The reaction tube 1 is a conversion tower that converts (defluorinates or reduces) $IF_7$ into $IF_5$. The reaction tube 1 is connected to a semiconductor device (not shown) via an exhaust gas flow-in passage 2, and exhaust gas generated in a semiconductor production process is introduced into the reaction tube 1. The semiconductor production process is, for example, an etching process performed by use of $IF_7$, a process of cleaning an etching device, or the like. In such a process, exhaust gas containing unreacted $IF_7$ and $IF_5$ as a reaction product is generated. The exhaust gas also contains He, Ne, Ar, Xe, Kr, $N_2$, $O_2$ and the like used for the semiconductor production process. The amount of the exhaust gas to be introduced into the reaction tube 1 is controlled by a valve 11.

The material to be fluorinated that is to fill the reaction tube 1 is fluorinated itself to convert $IF_7$ into $IF_5$. In this embodiment, the material to be fluorinated that is introduced into the reaction tube 1 may contain at least one element selected from, for example, Si, Al, W and I. The material to be fluorinated is not limited to such an element. In this embodiment, a material containing Si, which is generally used as a semiconductor, is preferably usable as the material to be fluorinated. Preferably, the material to be fluorinated that is to fill the reaction tube 1 contains at least one element selected from the above list at a content of at least 20% by weight. The material to be fluorinated contains at least one element selected from the above list more preferably at a content of at least 50% by weight, and still more preferably at a content of 80% by weight. When the content of such an element in the material to be fluorinated is less than 20% by weight, the conversion efficiency from $IF_7$ to $IF_5$ is not sufficient, which is not preferable.

Outside the reaction tube 1, a heater is located as a heating unit 4. The heating unit 4 maintains the inside of the reaction tube 1 at a temperature sufficiently high to convert $IF_7$ into $IF_5$ by use of the material to be fluorinated. The temperature used to convert $IF_7$ into $IF_5$ varies in accordance with the material to be fluorinated that fills the reaction tube 1 or the process pressure. In consideration of the reaction rate, the temperature used to convert $IF_7$ into $IF_5$ is preferably, for example, 20° C. or higher and 300° C. or lower. The reaction tube 1 can be driven at an optimal temperature in accordance with the material to be fluorinated. In the process of introducing the exhaust gas into the reaction tube 1 to convert $IF_7$ into $IF_5$, He, Ne, Ar, Xe, Kr, $N_2$ or the like is optionally usable as accompanying gas.

The residence time of the gas in the reaction tube 1 may be any time that is sufficient to convert $IF_7$ into $IF_5$. There is no influence on the recovery ratio even if the residence time is further extended. The time necessary to convert $IF_7$ into $IF_5$ depends on the flow rate. In the case where, for example, the reaction tube 1 is connected to an etching device, the time necessary to convert $IF_7$ into $IF_5$ depends on the etching rate in the etching device. In the case where the reaction tube 1 is connected to a common etching device, the residence time of the gas in the reaction tube 1 is about a few minutes (3 to 5 minutes).

The gas containing $IF_5$ converted from $IF_7$ in the reaction tube 1 is introduced into the trap device 5 via an exhaust gas flow-out passage 3. The amount of the gas to be introduced into the trap device 5 via the exhaust gas flow-out passage 3 is adjusted by a valve 12. The trap device 5 is used to trap $IF_5$ contained in the introduced gas, and may be, for example, a general-purpose cooling device. The trap device 5 is connected to, for example, an introduction passage 8 used to introduce a cooling liquid from a chiller 7 and also to an introduction passage 9 used to introduce the cooled liquid into the chiller 7. A valve 14 is provided in introduction passage 8, and a valve 15 is provided in the introduction passage 9. The temperature used to cool the trap device 5 can be adjusted by the valve 14 and the valve 15. The gas introduced into the trap device 5 is cooled at a predetermined temperature, for example, −80° C. or higher and 50° C. or lower. Thus, $IF_5$ is liquefied and thus trapped. The exhaust gas after $IF_5$ is trapped flows out from a gas discharge passage 6 via a valve 13.

As described above, according to the present invention, the recovery device 100 is used to put the gas containing $IF_7$ into contact with the material to be fluorinated and thus to convert $IF_7$ into $IF_5$ in the reaction tube 1. The gas containing the generated $IF_5$ is cooled in the trap device 5, and the $IF_5$ is trapped as an $IF_7$-derived iodine fluoride compound. Conventionally, a cooling device of a very low temperature is needed to condense and recover $IF_7$ contained in the exhaust gas, as described above. By contrast, according to the present invention, $IF_7$ is converted into $IF_5$ and thus the $IF_5$ can be recovered from the gas after being cooled in a temperature range realized by a general-purpose cooling device. A plurality of reaction tubes 1 and a plurality of trap devices 5 may be provided and used in a switched manner, so that the iodine fluoride can be recovered continuously.

The recovery device 100 may further include a fluorination device that reacts the recovered $IF_5$ with fluorine to generate $IF_7$. There are various known methods for fluorinating $IF_5$ to generate $IF_7$. Any of such known techniques can be applied for a fluorination device to be arranged in or connected to the recovery device 100.

EXAMPLES

Hereinafter, the present invention will be described in detail by way of examples. The present invention is not limited to the following examples. In the examples, the present invention was applied to exhaust gas generated in a dry etching process. As the material to be fluorinated that is introduced into the reaction tube 1, silicon (Si) was used in examples 1 through 6, activated alumina ($Al_2O_3$) was used in examples 7 through 12, iodine ($I_2$) was used in examples 13 through 17, and tungsten (W) was used in examples 18 through 22. In reference example 1, iodine ($I_2$) was used and the temperature of the reaction tube was different from example 17 and the like. In comparative examples 1 through 4, the reaction tube 1 was not used and the trap device 5 was used for the recovery.

Example 1

In example 1, the reaction tube 1 was filled with Si, and gas containing $IF_7$, $IF_5$ and $N_2$ at a volume ratio of $IF_7$:$IF_5$:$N_2$=50:10:40 was introduced into the reaction tube 1 at 100 sccm. The conversion from $IF_7$ into $IF_5$ was performed at a temperature of the reaction tube 1 of 80° C. $IF_5$ was trapped at a temperature of the trap device 5 of −50° C.

Example 2

In example 2, $IF_5$ was trapped under substantially the same conditions as those in example 1 except that the total flow rate of the gas to be introduced was 300 sccm.

Example 3

In example 3, $IF_5$ was trapped under substantially the same conditions as those in example 1 except that the volume ratio of $IF_7$, $IF_5$ and $N_2$ of the gas to be introduced was $IF_7$:$IF_5$:$N_2$=90:10:0.

Examples 4 and 5

In examples 4 and 5, $IF_5$ was trapped under substantially the same conditions as those in example 1 except that the cooling temperature of the trap device 5 was different. In example 4, the cooling temperature was −20° C. In example 5, the cooling temperature was −10° C.

Example 6

In example 6, $IF_5$ was trapped under substantially the same conditions as those in example 1 except that the temperature of the reaction tube 1 was 30° C.

Example 7

In example 7, the reaction tube 1 was filled with $Al_2O_3$, and gas containing $IF_7$, $IF_5$ and $N_2$ at a volume ratio of $IF_7$:$IF_5$:$N_2$=50:10:40 was introduced into the reaction tube 1 at 100 sccm. The conversion from $IF_7$ into $IF_5$ was performed at a temperature of the reaction tube 1 of 80° C. $IF_5$ was trapped at a temperature of the trap device 5 of −50° C.

Example 8

In example 8, $IF_5$ was trapped under substantially the same conditions as those in example 7 except that the total flow rate of the gas to be introduced was 300 sccm.

Example 9

In example 9, $IF_5$ was trapped under substantially the same conditions as those in example 7 except that the volume ratio of $IF_7$, $IF_5$ and $N_2$ of the gas to be introduced was $IF_7$:$IF_5$:$N_2$=90:10:0.

Examples 10 and 11

In examples 10 and 11, $IF_5$ was trapped under substantially the same conditions as those in example 7 except that the cooling temperature of the trap device 5 was different. In example 10, the cooling temperature was −20° C. In example 11, the cooling temperature was −10° C.

Example 12

In example 12, $IF_5$ was trapped under substantially the same conditions as those in example 7 except that the temperature of the reaction tube 1 was 30° C.

Example 13

In example 13, the reaction tube 1 was filled with $I_2$, and gas containing $IF_7$, $IF_5$ and $N_2$ at a volume ratio of $IF_7$:$IF_5$:$N_2$=50:10:40 was introduced into the reaction tube 1 at 100 sccm. The conversion from $IF_7$ into $IF_5$ was performed at a temperature of the reaction tube 1 of 300° C. $IF_5$ was trapped at a temperature of the trap device 5 of −50° C.

Example 14

In example 14, $IF_5$ was trapped under substantially the same conditions as those in example 13 except that the total flow rate of the gas to be introduced was 300 sccm.

Example 15

In example 15, $IF_5$ was trapped under substantially the same conditions as those in example 13 except that the volume ratio of $IF_7$, $IF_5$ and $N_2$ of the gas to be introduced was $IF_7$:$IF_5$:$N_2$=90:10:0.

Example 16

In example 16, $IF_5$ was trapped under substantially the same conditions as those in example 13 except that the cooling temperature of the trap device 5 was −20° C.

Example 17

In example 17, $IF_5$ was trapped under substantially the same conditions as those in example 13 except that the temperature of the reaction tube 1 was 200° C.

Example 18

In example 18, the reaction tube 1 was filled with W, and gas containing $IF_7$, $IF_5$ and $N_2$ at a volume ratio of $IF_7$:$IF_5$:$N_2$=50:10:40 was introduced into the reaction tube 1 at 100 sccm. The conversion from $IF_7$ into $IF_5$ was performed at a temperature of the reaction tube 1 of 100° C. $IF_5$ was trapped at a temperature of the trap device 5 of −50° C.

Example 19

In example 19, $IF_5$ was trapped under substantially the same conditions as those in example 18 except that the total flow rate of the gas to be introduced was 300 sccm.

Example 20

In example 20, $IF_5$ was trapped under substantially the same conditions as those in example 18 except that the volume ratio of $IF_7$, $IF_5$ and $N_2$ of the gas to be introduced was $IF_7$:$IF_5$:$N_2$=90:10:0.

Examples 21 and 22

In examples 21 and 22, $IF_5$ was trapped under substantially the same conditions as those in example 18 except that the cooling temperature of the trap device 5 was different. In example 21, the cooling temperature was −20° C. In example 22, the cooling temperature was −10° C.

Reference Example 1

In reference example 1, $IF_5$ was trapped under substantially the same conditions as those in example 17 except that the temperature of the reaction tube 1 was 30° C.

Comparative Examples 1 through 4

In comparative examples 1 through 4, the reaction tube 1 was not used. Gas containing $IF_7$, $IF_5$ and $N_2$ at a volume ratio of $IF_7:IF_5:N_2=50:10:40$ was introduced into the trap device 5 at 100 sccm. $IF_5$ was trapped at a temperature of the trap device 5 of −50° C. in comparative example 1, of −100° C. in comparative example 2, of −196° C. in comparative example 3, and of −10° C. in comparative example 4.

Table 1 shows the recovery ratio of $IF_5$ and the purity of $IF_5$ in the recovered gas in examples 1 through 22, reference example 1 and comparative examples 1 through 4.

not recovered when the cooling temperature of the trap device 5 was −10° C. As is clear from comparative examples 2 and 3, $IF_7$ needed to be cooled at −100° C. for trapping in order to realize a recovery ratio of 99% or higher without being converted into $IF_5$.

The following evaluation is as compared with example 1 unless otherwise specified. In example 1 through 3, Si was used as the material to be fluorinated. No difference was recognized in the recovery ratio or the purity of $IF_5$ even where the total flow rate of the gas to be introduced into the reaction tube 1 was higher as in example 2 or even where the ratio of $IF_7$ in the gas was higher as in example 3. By contrast, in examples 4 and 5, in which the cooling temperature of the trap device 5 was higher, the recovery ratio of $IF_5$ was slightly lower. In example 6, in which the temperature of the reaction tube 1 was 30° C., no difference was recognized in the recovery ratio or the purity of $IF_5$.

In example 7, in which $Al_2O_3$ was used as the material to be fluorinated, no difference was recognized in the recovery ratio or the purity of $IF_5$ as compared with examples 1 through 3. In example 8, in which the total flow rate of the gas to be introduced into the reaction tube 1 was 300 sccm, the recovery ratio of $IF_5$ was slightly lower. By contrast, in example 9, in which the ratio of $IF_7$ in the gas to be introduced into the reaction tube 1 was higher, no difference

TABLE 1

| | Gas concentration (% by volume) | | | Total flow rate | Material in reaction tower | Temp. of reaction tower (° C.) | Temp. of trap device (° C.) | Recovery ratio (converted into I) | Purity of $IF_5$ in recovered gas |
|---|---|---|---|---|---|---|---|---|---|
| | $IF_7$ | $IF_5$ | $N_2$ | (sccm) | | | | | |
| Ex. 1 | 50 | 10 | 40 | 100 | Si | 80 | −50 | 99.9 | >99 |
| Ex. 2 | 50 | 10 | 40 | 300 | | | | 99.9 | >99 |
| Ex. 3 | 90 | 10 | 0 | 100 | | | | 99.9 | >99 |
| Ex. 4 | 50 | 10 | 40 | 100 | | | −20 | 98.4 | >99 |
| Ex. 5 | 50 | 10 | 40 | 100 | | | −10 | 95 | >99 |
| Ex. 6 | 50 | 10 | 40 | 100 | | 30 | −50 | 99.9 | >99 |
| Ex. 7 | 50 | 10 | 40 | 100 | $Al_2O_3$ | 80 | −50 | 99.9 | >99 |
| Ex. 8 | 50 | 10 | 40 | 300 | | | | 94.3 | >99 |
| Ex. 9 | 90 | 10 | 0 | 100 | | | | 99.9 | >99 |
| Ex. 10 | 50 | 10 | 40 | 100 | | | −20 | 98.4 | >99 |
| Ex. 11 | 50 | 10 | 40 | 100 | | | −10 | 95 | >99 |
| Ex. 12 | 50 | 10 | 40 | 100 | | 30 | −50 | 80 | >99 |
| Ex. 13 | 50 | 10 | 40 | 100 | $I_2$ | 300 | −50 | 99.9 | >99 |
| Ex. 14 | 50 | 10 | 40 | 300 | | | | 95.6 | >99 |
| Ex. 15 | 90 | 10 | 0 | 100 | | | | 99.9 | >99 |
| Ex. 16 | 50 | 10 | 40 | 100 | | | −20 | 99.1 | >99 |
| Ex. 17 | 50 | 10 | 40 | 100 | | 200 | −50 | 95.1 | >99 |
| Ex. 18 | 50 | 10 | 40 | 100 | W | 100 | −50 | 94.7 | 82 |
| Ex. 19 | 50 | 10 | 40 | 300 | | | | 90.8 | 86 |
| Ex. 20 | 90 | 10 | 0 | 100 | | | | 99.4 | 78 |
| Ex. 21 | 50 | 10 | 40 | 100 | | | −20 | 92.4 | 86 |
| Ex. 22 | 50 | 10 | 40 | 100 | | | −10 | 90.6 | 88 |
| Reference ex. 1 | 50 | 10 | 40 | 100 | $I_2$ | 30 | −50 | 30.5 | >99 |
| Comparative ex. 1 | 50 | 10 | 40 | 100 | — | — | −50 | 40.1 | >99 |
| Comparative ex. 2 | 50 | 10 | 40 | 100 | | | −100 | 99.5 | >99 |
| Comparative ex. 3 | 50 | 10 | 40 | 100 | | | −196 | 99.9 | >99 |
| Comparative ex. 4 | 50 | 10 | 40 | 100 | | | −10 | 0 | >99 |

In the examples, the recovery ratio of $IF_5$ was 90% or higher even when the cooling temperature of the trap device 5 was −10° C. By contrast, the recovery ratio was merely 40% under the conditions of comparative example 1 even when the cooling temperature of the trap device 5 was −50° C. Under the conditions of comparative example 4, $IF_5$ was was recognized in the recovery ratio or the purity of $IF_5$. In examples 10 and 11, in which the cooling temperature of the trap device 5 was higher, the recovery ratio of $IF_5$ was slightly lower as in examples 4 and 5. In example 12, in which $Al_2O_3$ was used as the material to be fluorinated and the temperature of the reaction tube 1 was 30° C., the recovery ratio of $IF_5$ was slightly lower but still was twice the recovery ratio in comparative example 1.

In example 13, in which $I_2$ was used as the material to be fluorinated, no difference was recognized in the recovery ratio or the purity of $IF_5$ as compared with examples 1 through 3. In example 14, in which the total flow rate of the gas to be introduced into the reaction tube 1 was 300 sccm, the recovery ratio of $IF_5$ was slightly lower as in example 8. In example 15, in which the ratio of $IF_7$ in the gas to be introduced into the reaction tube 1 was higher, no difference was recognized in the recovery ratio or the purity of $IF_5$. In example 16, in which the cooling temperature of the trap device 5 was −20° C., the recovery ratio of $IF_5$ was slightly lower as in examples 4 and 10. In example 17, in which the temperature of the reaction tube 1 was 200° C., the recovery ratio of $IF_5$ was slightly lower. In reference example 1, in which the temperature of the reaction tube 1 was 30° C., the recovery ratio of $IF_5$ was about 30%. However, in reference example 1, the purity of $IF_5$ in the recovered gas exceeded 99%, which was equivalent to that of the above-evaluated examples of the present invention. In reference 1, the reaction temperature of the reaction tube 1 is lower. Therefore, the recovery ratio can be made as high as that of the examples of the present invention by making the reaction time sufficiently long. In the case where $I_2$ is used as the material to be fluorinated, $IF_5$ is generated and recovered. In the examples in which $I_2$ was used, a reduction in the mass of the material to be fluorinated in the reaction tube 1 was subtracted from the total recovery amount to calculate the recovery ratio of $IF_5$.

In example 18, in which W was used as the material to be fluorinated, the recovery ratio of $IF_5$ was slightly lower than in examples 1 through 3. In example 19, in which the total flow rate of the gas to be introduced into the reaction tube 1 was 300 sccm, the recovery ratio of $IF_5$ was slightly lower as in examples 8 and 14. By contrast, in example 20, in which the ratio of $IF_7$ in the gas to be introduced into the reaction tube 1 was higher, the recovery ratio of $IF_5$ was higher than in example 18. In examples 21 and 22, in which the cooling temperature of the trap device 5 was higher, the recovery ratio of $IF_5$ was slightly lower as in examples 4 and 5.

In examples 18 through 22, in which W was used as the material to be fluorinated, the purity of $IF_5$ in the recovered gas was lower. In the case where W is used as the material to be fluorinated, the reaction with $IF_7$ progresses as follows.

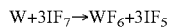

$W + 3IF_7 \rightarrow WF_6 + 3IF_5$

Therefore, in the case where W is used as the material to be fluorinated, $WF_6$ is trapped as a solid together with $IF_5$. This is why the purity of $IF_5$ is lower.

In the above-described examples, the recovery ratio is lower in the case where the temperature of the reaction tube 1 is lower. This is considered to occur because the reaction rate of converting $IF_7$ into $IF_5$ is decreased and thus the reaction time is insufficient. In the case where the cooling temperature of the trap device 5 is higher, the recovery ratio of $IF_5$ is lower. This occurs because $IF_5$ as a solid sublimates.

As described above, iodine heptafluoride-derived gas can be recovered at a high efficiency with no use of a very low temperature by use of the $IF_7$-derived iodine fluoride compound recovery method and recovery device according to the present invention.

According to the present invention, a method for recovering iodine heptafluoride-derived gas at a high efficiency with no use of a very low temperature, and a recovery device therefor, are provided.

The present invention is useful to recover iodine heptafluoride from iodine heptafluoride-containing gas that is discharged in microscopic processing performed by use of etching of a metal film in production of a semiconductor device.

The invention claimed is:

1. An $IF_7$-derived iodine fluoride compound recovery method, comprising:
   putting gas containing $IF_7$ into contact with a material to be fluorinated containing at least one of elemental Si, elemental W or aluminum oxide, thereby converting the $IF_7$ into $IF_5$; and
   cooling gas containing $IF_5$, thereby trapping the $IF_5$ as an $IF_7$-derived iodine fluoride compound.

2. The $IF_7$-derived iodine fluoride compound recovery method according to claim 1, wherein the material to be fluorinated is contained at a content of at least 20% by weight.

3. The $IF_7$-derived iodine fluoride compound recovery method according to claim 1, wherein the material to be fluorinated is Si.

4. The $IF_7$-derived iodine fluoride compound recovery method according to claim 1, wherein the $IF_5$ is recovered at a temperature of −80° C. or higher and 50° C. or lower.

5. The $IF_7$-derived iodine fluoride compound recovery method according to claim 2, wherein the $IF_5$ is recovered at a temperature of −80° C. or higher and 50° C. or lower.

6. The $IF_7$-derived iodine fluoride compound recovery method according to claim 3, wherein the $IF_5$ is recovered at a temperature of −80° C. or higher and 50° C. or lower.

7. A reuse method of $IF_7$ comprising:
   putting gas containing $IF_7$ into contact with a material to be fluorinated containing at least one of elemental Si, elemental W or aluminum oxide, thereby converting the $IF_7$ into $IF_5$;
   cooling gas containing the $IF_5$, thereby trapping the $IF_5$ as an $IF_7$-derived iodine fluoride compound;
   reacting the $IF_5$ that is recovered with fluorine, thereby generating $IF_7$; and
   reusing the generated $IF_7$ for a semiconductor production process.

8. The reuse method of $IF_7$ according to claim 7, wherein the material to be fluorinated is Si.

9. The reuse method of $IF_7$ according to claim 7, wherein the $IF_5$ is recovered at a temperature of −80° C. or higher and 50° C. or lower.

* * * * *